United States Patent [19]

Finley et al.

[11] Patent Number: 5,080,919

[45] Date of Patent: Jan. 14, 1992

[54] COOKIES WITH REDUCED SUCROSE CONTENT AND DOUGHS FOR PRODUCTION THEREOF

[75] Inventors: John W. Finley, Whippany; Patricia Verduin, Fair Lawn; Henry E. Arciszewski, Franklin Lakes; Richard H. Biggs, Paterson, all of N.J.

[73] Assignee: Nabisco Brands, Inc., Parsippany, N.J.

[21] Appl. No.: 205,482

[22] Filed: Jun. 1, 1988

Related U.S. Application Data

[63] Continuation of Ser. No. 702,035, Feb. 15, 1985, abandoned.

[51] Int. Cl.$^5$ .............. A21D 13/00; A21D 10/00; A21D 6/00
[52] U.S. Cl. ................................ 426/94; 426/549; 426/496; 426/502; 426/560; 426/658
[58] Field of Search .............. 426/94, 496, 502, 560, 426/549, 658

[56] References Cited

U.S. PATENT DOCUMENTS

| | | | |
|---|---|---|---|
| 3,586,513 | 6/1971 | Horn et al. | 99/134 |
| 4,137,336 | 6/1979 | Radlove | 426/555 |
| 4,185,127 | 1/1980 | Radlove | 426/554 |
| 4,250,202 | 2/1981 | Hartnett | 426/553 |
| 4,344,969 | 8/1982 | Youngquist et al. | 426/18 |
| 4,360,534 | 11/1982 | Brabbs et al. | 426/560 |
| 4,379,174 | 4/1983 | Radlove | 426/554 |
| 4,444,799 | 4/1984 | Vanderveer et al. | 426/549 |
| 4,455,333 | 6/1984 | Hong et al. | 426/94 |
| 4,456,625 | 6/1984 | Durst | 426/106 |
| 4,503,080 | 3/1985 | Brabbs et al. | 426/94 |
| 4,511,318 | 4/1985 | Kolodesh | 426/94 |
| 4,511,585 | 4/1985 | Durst | 426/106 |
| 4,514,430 | 4/1985 | Hartman | 426/549 |
| 4,528,900 | 8/1985 | Simelunas | 99/4507 |
| 4,534,726 | 8/1985 | Simelunas | 425/363 |
| 4,575,461 | 3/1986 | Friedman et al. | 426/549 |
| 4,578,027 | 3/1986 | Koppa et al. | 425/298 |
| 4,579,744 | 4/1986 | Thulin | 426/283 |
| 4,582,711 | 4/1986 | Durst | 426/128 |
| 4,624,856 | 11/1986 | Vanderveer et al. | 426/549 |
| 4,668,522 | 5/1987 | Cappel et al. | 426/94 |
| 4,828,853 | 5/1989 | Banks et al. | 426/94 |
| 4,892,745 | 1/1990 | Gage et al. | 426/549 |
| 4,965,076 | 10/1990 | Martin et al. | 426/18 |
| 4,965,077 | 10/1990 | Martin et al. | 426/18 |

FOREIGN PATENT DOCUMENTS

| | | | |
|---|---|---|---|
| 4111868 | of 1968 | Australia . | |
| 31718 | 7/1981 | European Pat. Off. . | |
| 98642 | 1/1984 | European Pat. Off. . | |
| 119824 | 9/1984 | European Pat. Off. . | |
| 119826 | 9/1984 | European Pat. Off. . | |
| 0208509 | 1/1987 | European Pat. Off. | 426/94 |
| 2740245 | 3/1978 | Fed. Rep. of Germany | 426/549 |
| 1517158 | 7/1978 | United Kingdom | 426/549 |

OTHER PUBLICATIONS

Ludewig, H. G. et al, Eingenung Verschiedener Staerkeverucherungstrodukte zur Herstellung von Muerbkeksen (Suitability of various starch-derived sugar products for preparation of cookies), Getreide, Mehl und Brot, 32, 100 (1978).

Glabe and Silverbrandt, Influence of Dextrin on Bread with High Honey Solids Content, Bakers Digest, 52(6), 16 (1978).

Dahle, L. K. et al, Wheat protein-starch interaction. II. Comparative abilities of wheat and soy proteins to bind starch, Cereal Chemistry 52(2), 212 (1975).

Chemical Abstracts, 97, 108805h (1982) (Abstract of Japanese patent 82/47500 published Mar. 18, 1982).

Chemical Abstracts, 98, 196729k (1983) (Abstract of Japanese patent 83/43747 published Mar. 14, 1983).

Chemical Abstracts 88, 188513p (1978) (Abstract of Japanese Patent 78/3547 published Jan. 13, 1978).

Schallenberger, R. S., J. Food Sci., 28, 584–589 (1963).

Doty et al, Food Technology, 29, 34–38 (1975).

Alternative Sweeteners, The Caloric Control Council, Atlanta, Ga. 30342, p. 6 (Jun. 3, 1980).

Guertin, Viscosity as a Measure of Biscuit Flour Quality, Bakers Digest 22 (4), 22 (1948).

Fuhr, Cookie Spread—Its Effects on Production and Quality, Bakers Digest 36(4), 56 (1962).

Lorenz et al, Cookie Spread—Effects of Baking Under Varying Atmospheric Pressures, Bakers Digest, 46(3), 22 (1972).

Bakers Digest, Problems in Baking, 46(3), 66 (1972).

Finney et al, Effects of Varying Quantities of Sugar, Shortening and Ammonium Bicarbonate on the Spreading and Top Grain of Sugar-Snap Cookies, Cereal Chemistry, 27(1), 30 (1950).

Yamazaki, The Concentration of a Factor in Soft Wheat Flours Affecting Cookie Quality, Cereal Chemistry, 32(1), 26 (1955).

Yamazaki, The Application of Heat in the Testing of Flours for Cookie Quality, Cereal Chemistry, 36(1), 59 (1959).

Sollars, Effects of Water-Soluble Constituents of Wheat Flour on Cookie Diameter, Cereal Chemistry, 36(6), 498 (1959).

Kissell et al, Effects of Flour Lipids on Cookie Quality, Cereal Chemistry, 48(6), 655 (1971).

(List continued on next page.)

Primary Examiner—Douglas W. Robinson
Assistant Examiner—Marian C. Knode

[57] ABSTRACT

Sucrose-free or -reduced cookies having the crispy texture associated with conventional sucrose-containing doughs can be prepared by replacing part or all of the sucrose with a combination of a glass-forming polysaccharide (preferably a maltodextrin) and a humectant sugar (preferably fructose). Multi-textured cookies can be prepared using the combination of glass-forming polysaccharide and humectant sugar in the crispy outer layer, and a humectant sugar as the sweetening agent in the soft, chewy center.

44 Claims, No Drawings

OTHER PUBLICATIONS

Kissell, Protein Enrichment of Cookie Flours with Wheat Gluten and Soy Flour Derivatives, Cereal Chemistry, 52(5), 538 (1975).

Badi and Hoseney, Use of Sorghum and Pearl Millant Flours in Cookies, Cereal Chemistry, 53(5), 733 (1976).

Yamazaki et al, Effects of Flour Fraction Composition on Cookie Diameter, Cereal Chemistry, 54(2) 352 (1977).

Yamazaki et al, Note on Effect of Brown Lipids on Cookie Quality, Cereal Chemistry, 56(6), 584 (1979).

Connor and Keagy, Folacin Retention and Cookie Diameter in Enriched Cookies: Regression Analysis Using Factorial Design, Cereal Chemistry 58(3), 239 (1981).

Matz, S. A., Cookie and Cracker Technology, AVI Publishing Company, Westport, Conn. (1978), pp. 4, 5, 16, 17, 123–125 and 135.

Manley, D. J. R., Technology of Biscuits, Crackers and Cookies, Ellis Horwood, Chichester, England (1983), pp. 211–214.

Chemical Abstracts, 64, 18304e (1966) (Abstract of Sollars and Bowie, Cereal Chemistry, 43(3), 244–260.

Shellenberger, Chlorine Beach and Cookie Doughs, Bakers Digest, 15(11), 296 (1941).

Bakers Digest, Problems in Baking, 38(1), 82 (1964).

Bakers Digest, Problems in Baking, 41(5), 123 (1967).

Report of the 1942–1943 Committee on Testing Biscuit Cracker Flours, Cereal Chemistry, 20(5), 595 (1943).

Yamazaki, An Alkaline Water Retention Capacity Test for the Evaluation of Cookie Baking Potentialities of Soft Winter Wheat Flours, Cereal Chemistry, 30(3), 242 (1953).

Hackh's Chemical Dictionary, third edition, the Blakiston Company, Philadelphia (1944), pp. 11, 53, 313, 383 and 510.

DeMan, J., Principles of Food Chemistry, AVI Publishing Company, Inc., Westport, Conn. (1980), pp. 154–155.

Pancoast, H. M. et al, Handbook of Sugar, AVI Publishing Company, Inc., Westport, Conn. (1980), pp. 154–155, 168, 281–284, 286, 409–410, 422, 532 and 595.

Radley, J. A., Starch and its Derivatives, Wiley, New York, N.Y., Third Edition (1954), vol. 1, pp. 52–53, 57, 114–117, 120–121, 224–235, 278–279, 282–283, 286–297, 380–381, 396–397, 418–437 and 468–469.

Pringsheim, H., The Chemistry of the Monosaccharides and of the Polysaccharides, McGraw-Hill, New York, N.Y., (1932), pp. 271–295.

Lineback, D. R. and Inglett, G. E., Food Carbohydrates, AVI Publishing Company, Inc., Westport, Conn. (1982), pp. 257–258, 260 and 268.

Matz, S., Cereal Technology, AVI Publishing Company, Inc., Westport, Conn. (1970), pp. 186–188.

Rose, A., and Rose, E., The Condensed Chemical Dictionary, fifth edition, Reinhold, New York, N.Y. (1956), p. 350.

The Merck Index, Merck and Company, Inc., Rahway, N.J., Eighth edition, (1968), p. 355.

Ockerman, H., Sourcebook for Food Scientists, AVI Publishing Company, Inc., Westport, Conn. (1978), pp. 89, 797 and 832.

Whistler, R. L. and Paschall, E. F. (Editors) Starch: Chemistry and Technology, Academic Press, New York, N.Y. (1967) vol. II, pp. 253–278.

Radley, J. A., Industrial Uses of Starch and its Derivatives, Applied Science Publishers Ltd., London, England (1967) pp. 96–97 and 106.

Kerr, R. W. Chemistry and Industry of Starch, Academic Press, New York, N.Y., second edition (1950), pp. 210–215, 240–243, 345–373, 412–417 and 443–453.

Banks, W., and Greenwood, C. T., Starch and its Components, Edinburgh University Press, Scotland (1975).

Pancoast, *Handbook of Sugars*, 2nd ed., pp. 367 and 388 (1980).

Ash, "Research On Lactose Indicates Uses, Limitations As A Substitute for Sucrose", *Food Product Development*, 10(6), pp. 85–88 (1976).

Sloan et al, "Investigating Alternative Humectants For Use In Foods" *Food Product Development*, vol. 9, No. 7, p. 75 (1975).

Plyer, *Baking Science & Technology*, Siebel Publishing Co., Chicago, Ill., pp. 432–433 (1973).

Manning, E., "Marble Molasses Cake Squares", Farm Journals Complete Home Baking Book (1979).

COOKIES WITH REDUCED SUCROSE CONTENT AND DOUGHS FOR PRODUCTION THEREOF

This application is a continuation of application Ser. No. 702,035, filed Feb. 15, 1985 now abandoned.

FIELD OF THE INVENTION

This invention relates to cookies having reduced sucrose content, and to doughs for the production of such cookies. More specifically, the invention relates to cookies and doughs in which the sucrose content is reduced or eliminated, while still retaining the crispy texture associated with the use of sucrose in cookies.

BACKGROUND OF THE INVENTION

Traditionally, sucrose has been used as the major, and most often the sole, sweetening agent in cookie doughs. When a cookie dough contains sucrose as the sole sweetening agent, at the completion of baking the sucrose is largely present as pockets of saturated sucrose solution held within the crumb matrix of the cookie. As the baked cookie cools to room temperature, or shortly thereafter, the readily-crystallizable sucrose begins to crystallize from these pockets of saturated sucrose solution. As the sucrose crystallizes, free moisture is lost from the cookie to the surrounding environment, even when the cookie is stored in a closed container. In two weeks or less, this loss of moisture from the cookie leads to a crispy texture throughout the cookie, even when the initial post-baking moisture content of the cookie is relatively high, for example 6 percent by weight or more.

The crispy texture produced by sucrose-containing cookie doughs is desired in most types of cookies and is one of the major reasons for including sucrose in the cookie dough. In addition, sucrose of course imparts a desirable sweet taste to the cookie dough. However, for a variety of health-related reasons, including the association of sucrose with cariogenicity, hyperactivity and diabetes, there is a need to reduce or eliminate the sucrose content of cookies, while still retaining the desirable attributes of sweetness and crispness conferred on the cookies by sucrose.

The complete or substantial elimination of sucrose from a conventional cookie dough which contains flour, water, sucrose, shortening and minor amounts of flavorants and colorants, and which in its sucrose-containing form produces crisp cookies, results in a "flaky" texture typical of biscuits. In addition, of course, the normal sweet taste of sucrose-containing cookies is lost. The changes in texture, sweetness, appearance, flavor and mouthfeel in the finished cookie produced from such a sucrose-reduced or -free dough makes them highly unattractive to consumers in general, and effectively restricts their use to dedicated dieters or people whose dietary intakes are restricted medicinally for reasons such as diabetes and excessive obeseness.

Attempts have been made to use a variety of other saccharides to replace sucrose as a sweetening agent in cookie and other doughs. For example:

Ludewig, H. G. et al, Eingenung Verschiedener Staerkeverzucherungstrodukte zur Herstellung von Muerbkeksen (Suitability of various starch-derived sugar products for preparation of cookies), Getreide, Mehl und Brot, 32, 100 (1978), describes experiments in which attempts were made to replace sucrose in cookie doughs with one of a variety of glucose syrups, maltodextrin or a high-fructose glucose syrup. All of these saccharide materials produced major changes in the properties of the resultant cookies, even when only 30 percent of the sucrose was replaced with the other saccharide material. For example, replacement of 30 percent of the sucrose with maltodextrin produced cookies which had a hard texture, felt hard and splintery when bitten and gave insufficient browning. The cookies were not sweet and tasted bland. On the other hand, replacement of 30 percent of the sucrose with the fructose-glucose syrup produced cookies with a vivid yellowish color and a soft, oily bite.

It has been reported that the addition of dextrin to bread having a high honey solids content partially overcomes the tendency of the high quantity of honey solids to decrease the volume of the bread; see:

Glabe and Silverbrandt, Influence of Dextrin on Bread With High Honey Solids Content, *Bakers Digest*, 2(6), 16 (1978).

This article suggests that the dextrin appears to facilitate the gluten-water reaction by reducing the time necessary for the water to penetrate in to the flour protein.

Interactions between wheat and soy proteins and starch and differences in the ability to bind dextrins are discussed in:

Dahle, L. K. et al, Wheat protein-starch interaction II. Comparative abilities of wheat and soy proteins to bind starch, *Cereal Chemistry*, 52(2), 212 (1975).

Dextrin made by hydrolyzing waxy starch with alpha and beta amylases has been stated to improve the quality of Japanese cakes; see:

Chemical Abstracts, 97, 108805h (1982) (Abstract of Japanese patent 82/47500 published March 18, 1982).

Also, addition of a compound containing 40-80 percent of oils and fats, 15-50 percent of water and 1-10 percent of cyclodextrin in an amount of from 1-40 percent to rice cracker dough has been though to markedly improve crunchiness and texture of the resultant rice crackers; see:

Chemical Abstracts, 98, 196729k (1983) (Abstract of Japanese patent 83/43747 published March 14, 1983).

Chemical Abstracts 88, 188513p (1978) (Abstract of Japanese patent 78/3547 published January 13, 1978) states that the texture, flavor and taste of bakery products can be improved by adding thereto a mixture of calcium stearoyllactate, gelatin and dextrin or lactose.

Fructose is potentially sweeter than sucrose. Consequently, there is a theoretical advantage to replacing sucrose, in baked products which normally contain this sugar, with a smaller quantity of fructose to provide an equivalent degree of sweetness. Fructose has an agreeable sweetness and is claimed to be 15-80 percent sweeter than sucrose. See Schallenberger, R. S., *J. Food Sci.*, 28, 584-89 (1963). However, the relative sweetness of fructose depends on its physical state; see Doty et al, *Food Technology*, 29, 34-38 (1975). Fructose is sweeter when cold, and at neutral or slightly acidic pH, or in dilute solution.

U.S. Pat. Nos. 4,137,336, 4,185,127 and 4,379,174, all to Radlove, state that the use of fructose as a replacement for sucrose to reduce calories in baked goods has met with little success because fructose loses much of its sweetness upon heating of the batter. U.S. Pat. No. 4,137,336 describes a dietetic cookie mix in which torula yeast, stearoyl monoglyceridyl citrates and propylene glycol monostearate are used to enable the fructose to retain a sufficient degree of sweetness when it is heated during the cookie baking process. U.S. Pat. No. 4,185,127 describes a dietetic cake mix in which crystalline fructose is combined with baking powder having glucono-delta lactone as the acidic component and emulsifiers such as propylene glycol monostearate and lactated monoglycerides to obtain a product which has an acceptably sweet taste upon baking. In U.S. Pat. No. 4,379,174, high fructose corn syrup is used to replace the expensive crystalline fructose used in the dietetic cake mix described in U.S. Pat. No. 4,185,127.

Fructose is known to aid moisture retention in baked goods, but reportedly does not provide the texture, consistency or color that would encourage its widespread use in baked goods. See *Alternative Sweetners*, The Caloric Control Council, Atlanta, Ga. 30342, page 6 (June 3, 1980). Moreover, retention of water by the fructose would tend to produce a soft or chewy texture as opposed to a crispy texture in the baked goods.

The use of other humectant sugars, such as dextrose, corn syrups, invert syrups, high fructose corn syrups, honey molasses and mixtures thereof, as a complete replacement for sucrose to provide a desired degree of sweetness to a baked product also tends to impart a soft or chewy texture to the baked goods. Additionally, replacement of the sucrose with at least one humectant sugar to reduce the quantity of sucrose used to less than 25 percent of the total weight of sugars, tends to result in a soft or chewy texture.

In experiments leading to the present invention, attempts were made to replace sucrose with maltodextrins having a dextrose equivalent (DE) of 5 to 15. It was found that substitution of maltodextrin for sucrose substantially reduced the sweetness level of the baked cookie. Moreover, although maltodextrins do produce an amorphorous, glassy solid as a result of the dehydration accompanying baking, and this amorphorous glassy solid does tend to impart a crispy texture to the baked cookie, the glass-forming abilities of relatively low DE maltodextrins are such that the texture of the resultant cookie is perceived as brittle rather than crisp. Moreover, replacement of the sucrose with maltodextrins cause a very severe reduction in cookie spread.

Cookie spread is known to be a relatively complex phenomenon influenced by a wide variety of factors, and numerous attempts have been made to find process for the control of cookie spread. See, for example:

A. Guertin, Viscosity as a Measure of Biscuit Flour Quality, *Bakers Digest* 22(4), 22 (1948);
B. Fuhr, Cookie Spread--Its Effects on Production and Quality, *Bakers Digest*, 36(4), 56 (1962);
C. Lorenz et al, Cookie Spread--Effects of Baking Under Varying Atmospheric Pressures, *Bakers Digest*, 46(3) 22 (1972);
D. *Bakers Digest* 46(3), 66 (1972);
E. Finney et al, Effects of Varying Quantities of Sugar, Shortening and Ammoninum Bicarbonate on the Spreading and Top Grain of Sugar-Snap Cookies, *Cereal Chemistry*, 27(1), 30 (1950);
F. Yamazaki, The Concentration of a Factor in Soft Wheat Flours Affecting Cookie Quality, *Cereal Chemistry*, 32(1), 26 (1955);
G. Yamazaki, The Application of Heat in the Testing of Flours for Cookie Quality, *Cereal Chemistry*, 36(1), 59 (1959);
H. Sollars, Effects of Water-Soluble Constituents of Wheat Flour on Cookie Diameter, *Cereal Chemistry*, 36(6), 8 (1959);
I. Kissell et al, Effects of Flour Lipids on Cookie Quality, *Cereal Chemistry*, 48(6), 655 (1971);
J. Kissell, Protein Enrichment of Cookie Flours with Wheat Gluten and Soy Flour Derivatives, *Cereal Chemistry*, 52(5), 538 (1975);
K. Badi and Hoseney, Use of Sorghum and Pearl Millant Flours in Cookies, *Cereal Chemistry*, 53(5), 733 (1976);
L. Yamazaki et al, Effects of Flour Fraction Composition on Cookie Diameter, *Cereal Chemistry*, 54(2), 352 (1977);
M. Yamazaki et al, Note on Effect of Brown Lipids on Cookie Quality, *Cereal Chemistry*, 56(6), 584 (1979);
N. Connor and Keagy, Folacin Retention and Cookie Diameter in Enriched Cookies: Regression Analysis Using Factorial Design, *Cereal Chemistry*, 58(3), 239 (1981);
O. Matz, S. A., Cookie and Cracker Technology, AVI Publishing Company, Westport, Conn. (1978), pages 4, 5, 16, 17, 123–125 and 135;
P. Manelley, D. J. R., Technology of Biscuits, Crackers and Cookies, Ellis Horwood, Chichester, England 1983), pages 211–214;
Q. Chemical Abstracts, 64, 18304e (1966) (Abstract of Sollars and Bowie, *Cereal Chemistry*, 43(2), 244–60 (1966));
R. Shellenberger, Chlorine Bleach and Cookie Doughs, *Bakers Digest*, 15(11), 206 (1941);
S. *Bakers Digest*, 38(1), 82 (1964)
T. *Bakers Digest*, 41(5), 123 (1967)
U. Report of the 1942–1943 Committee on Testing Biscuit Cracker Flours, *Cereal Chemistry*, 20(5), 595 (1943); and
V. Yamazaki, An Alkaline Water Retention Capacity Test for the Evaluation of Cookie Baking Potentialities of Soft Winter Wheat Flours, *Cereal Chemistry*, 30(3), 242 (1953).

Among the methods for increasing cookie spread suggested in these references are addition of flour or bran lipids to the dough (references I, J and M), addition of soybean or safflower lecithins to the dough (references J and K), increasing the baking time at lower baking temperatures (reference N), using coarse flour particles (references D and P), using a cold ovenband at the time of deposition of the dough pieces (reference P), decreasing the atmospheric pressure during baking (reference C), elimination of the hydrophilic starch tailings or water-soluble polysaccharides from flour (references F, H, L and Q), using a greasy ovenband (reference P), using a dough of high pH with an increase in the amount of ammonium bicarbonate (references E, N, O and P), using low temperatures in the front of the oven (references O and P), using a low viscosity flour (references A, D and G), covering up the flour hydration sites (reference B), using minimal mixing prior to dough standing (reference P), pretreatment of the flour with enzymes to lower its viscosity (reference A), pretreatment of the flour with sulfides and xanthates to lower its viscosity (reference A) and producing soft doughs using higher temperatures (references B, N and P). Many of these methods are difficult or costly to apply to high throughput industrial processes for the production of cookies, and it seems doubtful whether any of these methods, alone or in combination, would overcome the very great reduction in cookie spread experienced when sucrose is replaced with maltodextrins in cookie doughs.

There is thus a need for methods of reducing or eliminating the sucrose content of cookie doughs which does not give rise to the problems of lack of sweetness, brittleness of texture and lack of spread experienced in previous attempts to reduce or eliminate the sucrose content of cookies. This invention provides such a cookie dough and cookies produced therefrom.

SUMMARY OF THE INVENTION

This invention provides a process and a cookie dough composition for producing cookies having a crisp texture, the process and dough composition using, as a sweetening agent, an edible glass-forming polysaccharide and a humectant sugar.

This invention also provides a cookie dough composition for producing a multi-textured cookie in which the outer layer has a crisp texture, the composition having a center formed of a first cookie dough comprising flour, fat or shortening and a humectant, and an outer layer surrounding the center, the outer layer being formed of a second cookie dough comprising flour, a fat or shortening, a glass-forming polysaccharide and a humectant sugar.

The term "polysaccharide" is used herein to denote any saccharide, or mixture of saccharides, containing an average of at least about 3 saccharide units per molecule. The term "polysaccharide" as used herein thus excludes pure monosaccharides and disaccharides, but includes trisaccharides, tetrasaccharides and higher polymers, together with mixtures of such higher polymers with minor amounts of mono- and disaccharides, provided that the average number of saccharide units in each molecule is at least about 3.

DETAILED DESCRIPTION OF THE INVENTION

In the process and cookie of the present invention, a mixture of an edible glass-forming polysaccharide and a humectant sugar is used as the sweetening agent. It has been found that the use of this sweetening agent in at least one dough used to prepare the cookie provides the resultant dough portion of the baked cookie with a shelf-stable crispy, non-brittle texture similar to that produced using sucrose as the sweetening agent, without adversely affecting oven spread of the cookie during baking. The term "dough portion" is used herein to refer to a portion of a cookie derived solely from a single dough used to produce the cookie and excludes heterogeneous inclusions such as chocolate chips, nuts, cream fillings etc. which are frequently added to cookies. In the case of single textured cookies, which are produced from a single dough, there will be only a single dough portion in the cookie, this single dough portion comprising all the dough-derived parts of the cookie but excluding the heterogeneous inclusions. However, in the case of multi-textured cookies produced using more than one dough, there will be a plurality of dough portions in each cookie, each dough portion comprising that part of the cookie derived from a single dough.

The use of the glass-forming polysaccharide and humectant sugar, in appropriate quantities, also produces cookies having a sweetness approximating that produced with sucrose and, in multi-textured cookies, avoid problems caused by moisture migration experienced when maltodextrin alone is used as the sweetening agent.

It is surprising that the combination of glass-forming polysaccharide and humectant sugar used as the sweetening agent in the process of the invention provides a crispy texture in the resultant sugar similar to that obtained using sucrose, since hitherto humectant sugars have been used in cookie doughs to produce a soft, chewy texture in the resultant cookies. Indeed, humectant sugars have been recommended for use as sweetening agents in the production of chewy cookies precisely because they confer upon such cookies a soft, chewy texture very different from the crispy texture of cookies produced by using sucrose as the sweetening agent. Nevertheless, it has been found that, in accordance with the invention, the use of an edible glass-forming polysaccharide in combination with a humectant sugar in the process and cookie of the invention does produce in the baked cookie a crispy, non-brittle texture closely resembling that by using sucrose as the sweetening agent. Provided conventional proper packaging techniques, which will be familiar to those skilled in the art, are used to package the cookies of the invention, the crispy non-brittle texture produced by the glass-forming polysaccharide/humectant sugar sweetening agent is retained for extended periods of time.

Although other glass-forming polysaccharides, for example hydrolyzed cereal solids, corn syrup solids and hydrogenated starch hyrolyzates, can be used in the processes and cookies of this invention, the preferred glass-forming polysaccharides are maltodextrins, since the use of maltodextrins, in conjunction with humectant sugars, has been found to give a proper crisp but non-brittle texture in the baked cookie. Maltodextrins are commercially-available products produced by hydrolysis of starch (normally corn starch) and are extensively discussed in the literature. See, for example:

Hackh's Chemical Dictionary, third edition, the Blakiston Company, Philadelphia (1944), pages 11, 53, 262, 313, 383 and 510;

DeMan, J., Principles of Food Chemistry, AVI Publishing Company, Inc., Westport, Conn. (1980) pages 154-155;

Pancoast, H. M. et al, Handbook of Sugars, AVI Publishing Company, Inc., Westport, Conn. (1980), pages 154-155, 168, 281-284, 286, 409-410, 422, 532 and 595;

Radley, J. A., Starch and its Derivatives, Wiley, New York, N.Y., Third Edition (1954), volume 1, pages 52-53, 57, 114-117, 120-121, 224-235, 278-279, 282-283, 286-297, 380-381, 396-397, 418-337 and 468-469;

Pringsheim, H., The Chemistry of the Monosaccharides and of the Polysaccharides, McGraw-Hill, New York, N.Y., (1932), page 271-295;

Lineback, D. R. and Inglett, G E., Food Carbohydrates, AVI Publishing Company, Inc., Westport, Conn. (1982), pages 257-258, 260 and 268;

Matz, S., Cereal Technology, AVI Publishing Company, Inc., Westport, Conn. (1970), pages 186 and 188;

Rose, A. and Rose, E., The Condensed Chemical Disctionary, fifth edition, Reinhold, New York, N.Y. (1956), page 350;

The Merck Index, Merck and Company, Inc., Rahway, N.J., Eighth edition, (1968), page 355;

Ockerman, H., Sourcebook for Food Scientists, AVI Publishing Company, Inc., Westport, Conn. (1978), pages 89, 797 and 832;

Whistler, R. L. and Paschall, E. F. (Editors) Starch: Chemistry and Technology, Academic Press, New York, N.Y. (1967) Volume II, pages 253-278;

Radley, J. A., Industrial Uses of Starch and its Derivatives, Applied Science Publishers Ltd., London, England (1967) pages 96-97 and 106;

Kerr, R. W., Chemistry and Industry of Starch, Acedamic Press, New York, N.Y., second edition (1950), pages 210-215, 240-243, 345-373, 412-417 and 443-453; and Banks, W., and Greenwood, C. T., Starch and its Components, Edinburgh University Press, Scotland (1975).

As described in the above references, maltodextrins are produced by hydrolysis, normally enzymatic hydrolysis, of starch. The degree of hydrolysis effected in the starch starting material to produce a particular maltodextrin is conventionally measured as the dextrose equivalent (DE) of the maltodextrin. The higher the dextrose equivalent of a maltodextrin, the greater the degree of hydrolysis of the starch and the lower the average molecular weight of the maltodextrin. The dextrose equivalent of maltodextrins range from about 4 to about 25. In order to produce the optimum texture in the baked cookie, we prefer to use, in the process and compositions of the invention, maltodextrins having a dextrose equivalent of 5 to 15 and desirably 10 to 15. In such preferred maltodextrins, at least 90 percent of the weight of the carbohydrate in the maltodextrin is in the form of tetra- or higher polysaccharides. Two specific preferred commercially-available maltodextrins are the materials sold by American Maize-Products Company, Corn Processing Division, 1100 Indianapolis Boulevard, Hammond, Ind. 43620 under the trademarks Lo-Dex 5 and 10. Lo-Dex 5 contains less than 1 percent of monosaccharides, less than 2 percent of disaccharides, less than 2 percent of trisaccharides and at least 95 percent of tetra- and higher polysaccharides (by weight, on the basis of total weight of saccharides present), while Lo-Dex 10 contains approximately 1 percent of monosaccharides, 4 percent of disaccharides, 5 percent of trisaccharides and 90 percent of tetra- and higher polysaccharides.

A variety of humectant sugars, for example honey, molasses, dextrose, corn syrups and invert syrups can be used in the processes and cookies of this invention. However, in order to provide the desired combination of sweetness and texture in the baked cookie the humectant sugar preferably comprises fructose. The fructose is conveniently provided in the form of a high fructose corn syrup.

High fructose corn syrups are low in cost, are highly humectant, provide a pleasant sweet taste, and are readily commercially available. They are prepared by the enzymatic isomerization of dextrose containing corn syrups, and typically possess a sugar solids component of about 40% to about 100% by weight fructose, with the balance of the non-fructose sugar solids being primarily dextrose plus minor amounts of other monosaccharides. The sugar solids content of commercially available high fructose corn syrups typically ranges from about 70% to 73%, up to about 82% by weight. Commercially available high fructose corn syrups having at least 80% by weight of their solids as fructose are readily available and are preferred for use in the process and compositions of the present invention.

In addition to fructose, the cookie dough desirably contains a minor proportion of dextrose to ensure proper browning during baking of the cookie.

The amounts of glass-forming polysaccharide and humectant sugar used in the processes and compositions of the invention will of course vary depending upon the desired taste of the cookie, and upon the quantities of the glass-forming polysaccharide and humectant sugar necessary to achieve the desired degree of cookie spread and the desired texture in the final product. Although the optimum amounts of glass-forming polysaccharide and humectant sugar for any particular application can of course be determined empirically by routine tests, in general it may be stated that the total quantity of glass-forming polysaccharide and humectant sugar should be approximately the same as the weight of sucrose which it replaces. Thus, the glass-forming polysaccharide is desirably added to the dough in an amount of from about 10 to about 20 percent by weight of the dough, and preferably in the amount from about 12 to about 18 percent by weight of the dough. (All references herein to proportions by weight of the dough are to proportions by weight of the substantially homogeneous dough mixture itself i.e. excluding heterogeneous inclusions such as chocolate chips, nuts, cream fillings etc. which are frequently added to cookies.)

The quantity of humectant sugar needed in any particular application tends to be somewhat more variable, in view of the difference in sweetness among the various humectant sugars, but the preferred humectant sugar fructose is desirably added to the dough in an amount from about 4 to about 12 percent by weight of the dough and preferably in an amount from about 6 to about 10 percent by weight of the dough. In order that the quantity of humectant sugar present will be sufficient to provide a proper level of sweetness, and overcome the tendency of glass-forming polysaccharide-containing cookies to have a brittle texture, the ratio of the amount of glass-forming polysaccharide to humectant sugar should be controlled. This ratio is preferably in the range of from about 3:1 to about 1:1, and desirably in the range from about 2.5:1 to about 1.5:1.

The combination of glass-forming polysaccharide and humectant sugar used in the processes and cookies of the invention can be used to replace part or all of the sucrose used in a conventional cookie dough used to produce a crisp cookie. It is one of the important advantages of the process of the invention that, unlike certain prior art processes which can only achieve partial replacement of sucrose, the process of the invention permits the total elimination of sucrose from a cookie dough, while still enabling proper oven spread and a proper crisp texture to be achieved in the resultant dough portion of the baked cookie. Specific sucrose-free doughs which produce a crisp dough portion are shown in the Examples below. To achieve substantial reduction in the sucrose content of the dough, it is desirable that at least 75 percent of the sucrose be replaced i.e. that in the process and compositions of the invention, sucrose comprise no more than 25 percent by weight of the sweetening agent present, and preferably less than about 1 percent by weight of the dough. Indeed in order to overcome the health problems associated with the use of sucrose, it is preferred that the dough be essentially free of sucrose.

The glass-forming polysaccharide/humectant sugar sweetening agent can be used in preparing multi-textured cookies in which first and second cookie doughs are separately prepared by mixing flour, sweetening agent and fat or shortening and a portion of the first cookie dough (hereinafter referred to as the "inner" or "filler" dough) is enrobed within a portion of the second cookie dough (hereinafter referred to as the "outer" or "casing" dough) and baked to produce a multi-textured cookie in which the center derived from the filler dough) and the outer layer (derived from the casing dough) differ in texture, the compositions of the doughs normally being chosen so that the center has a softer, more chewy texture than the outer layer. Before being combined with the casing dough, the filler dough is preferably cooled to about 60° to about 65° F. (about 5.6° to about 18.3° C.) using carbon dioxide snow to facilitate its transfer to a coextruder.

The two cookie doughs may be combined by coextrusion through concentric dies to obtain a coextrudate rope with the filler dough inside and the casing dough outside. The coextrudate rope may then be cut into pieces using a reciprocating cutter which severs the rope and stretches the casing dough to close the end portions of the rope so as to obtain a composite dough piece in which a center formed of the filler dough is completely surrounded by an outer layer formed of the casing dough, this composite dough piece thus being bakeable to form a multi-textured cookie. Apparatus for forming the composite dough piece is described in detail in pending U.S. Application Ser. No. 540,982, now U.S. Pat. No. 4,528,900, entitled, "High Production Method And Apparatus For Forming Filled Edible Products", and in U.S. Application Ser. No. 540,983, now U.S. Pat. No. 4,534,726, entitled "Apparatus Having Shims Underlying Portions of a Die", both filed in the name of William Simelunas on Oct. 11, 1983. These patents are herein incorporated by reference.

The composite dough pieces bakeable to multi-textured cookies suitably have a weight ratio of the filler cookie dough to the casing cookie dough within the range of from about 0.80 to about 1.2, approximately equal amounts of each dough being preferred.

When the process of the invention is employed to produce such a multi-textured cookie, the combination of the glass-forming polysaccharide and the humectant sugar will normally only be used in the casing dough, since the crispy texture resulting from the sweetening agent is only desired in the outer layer of the cookie. Any of the known sweetening agents suitable for producing a soft, chewy texture may be used in the filler dough. However, since a humectant sugar, when used alone as the sweetening agent, will produce a soft, chewy texture in the resultant dough portion, it is very convenient, when preparing a multi-textured cookie by the process of the invention to use a humectant sugar alone as the sweetening agent in the filler dough and a combination of a humectant sugar and a glass-forming polysaccharide as a sweetening agent in the casing dough, since this simplifies the preparation of the two doughs. For example, in the specific Examples given below, high fructose corn syrup is used as the sweetening agent in the filler dough, and a combination of high fructose corn syrup and maltodextrin as the sweetening agent in the casing dough.

The filler cookie dough used for producing multi-textured cookies by the process and dough composition of the present invention may be any of the cookie doughs known to be capable of producing a soft or chewy texture in the center of a multi-textured cookie. As is well known to those skilled in the art a soft or chewy texture in the center of a multi-textured cookie can be achieved by including a humectant in the filler cookie dough used to produce this center. When humectants are added to a cookie dough, the product baked from such a dough will possess a plastic, moist and non-hardening crumb structure, which will be retained during storage in conventional packing for periods greater than two weeks and up to several months. A wide variety of food-compatable humectants may be employed for imparting shelf-stable soft or chewy texture to the centers of the multi-textured cookies produced by the process of the present invention. Humectants which can be employed include sugar and/or non-sugar ingredients which bind moisture in a baked dough. If a non-sugar humectant is employed, the filler cookie dough may also need to include a sugar to provide the requisite degree of sweetness to the center of the cookie. The binding should be such that the equilibrium rate of moisture loss from the cookie to the environment due to the presence of the humectant is slowed to such a degree that a multi-textured cookie containing the humectant in its center, and having an initial moisture content of at least about 6 percent, retains in its center a soft and pliable texture for at least about 2 months, and preferably for at least about 4-6 months, when the cookie is stored in a closed container.

Edible humectant gels such as a humectant sucrose gel and/or a high fructose corn syrup gel can be used in the filler cookie dough for achieving a soft and chewy texture which is stable for prolonged periods. Preparation of the gels and of doughs containing them for producing soft edible baked products having extended shelf life is taught in U.S. Pat. No. 4,444,799. A humectant sucrose gel can be prepared, for example, from a mixture of sucrose syrup, sodium alginate, and a calcium ion source. The gels may also be prepared as taught in U.S. application Ser. No. 712,206 filed Mar. 15, 1985, now U.S. Pat. No. 4,624,856, which application is a continuation of U.S. application Ser. No. 580,365, filed Feb. 16, 1984, now abandoned, which is a continuation-in-part of the application which issued as U.S. Pat. No. 4,444,799. The aforementioned patent and pending application are both incorporated herein by reference in their entirety.

Humectant sugars may be employed alone or in combination with non-humectant sugars (such as sucrose) in the filler cookie dough to impart a soft or chewy texture to the center of the multi-textured cookie. Suitable humectant sugars include fructose, dextrose, corn syrups, invert syrups, high fructose corn syrups, honey, molasses, as well as mixtures of one or more of the foregoing humectants with sucrose. For example, a suitable humectant sugar composition for use in the filler cookie dough may comprise about 0 to 85 percent sucrose, with the balance of the sugar being comprised of fructose and/or dextrose employed in the form of crystallized sugar. Alternatively, the balance of the sugar may be provided by the sugar solids content of a corn syrup, honey or a high fructose corn syrup, or another humectant sugar.

Commercially available high fruotose corn syrups are prepared by the enzymatic isomerization of dextrose containing corn syrups, and typically possess a sugar solids component of about 40 percent to about 100 percent by weight fructose, with the balance of the non-fructose sugar solids being primarily dextrose plus minor amounts of other monosaccharides. The sugar solids content of commercially available high fructose corn syrups typically ranges from about 70 percent to about 73 percent, up to about 82 percent by weight. Examples of other humectant sugars include maltose, sorbose, mannose, lactose and galactose. When sucrose is employed in the filler cookie dough, the humectant sugar should comprise at least about 15 percent, and preferably at least about 20 percent, by weight of the total sugar content of the filler cookie dough.

In addition to the humectant sugars, a wide variety of humectants which are not sugars all possess a low degree of sweetness relative to sucrose may also be employed in the filler cookie dough. For example, the use of glycerol, sugar alcohols such as mannitol, maltitol, xylitol and sorbitol, and other polyols, as humectants is well known in the art. Additional examples of humectant polyols (i.e. polyhydric alcohols) include humectant glycols, for example, propylene glycol, hydrogenated glucose syrups, sugar esters, dextrins, and other starch hydrolyzation products. When sucrose is employed in combination with one or more of the foregoing humectants, the humectant should comprise at least about 15 percent, and preferably at least about 20 percent, by weight of the humectant and sucrose combination.

The humectant may be included in the dough as an added ingredient, or an enzyme may be included in the dough formulation which acts on a substrate also included in the dough during, before or after baking, to produce effective amounts of the humectant in situ in the dough. Examples of suitable enzymes for the purpose include invertase which effects the inversion of sucrose to invert sugar, as well as other glycosidases and polysaccharidases which after acting on carbohydrates present in the dough produce humectants as the by-products of their enzymatic activity.

Enzymes suitable for use in this manner include polysaccharidases which act upon farinaceous materials to produce lower molecular weight saccharides such as glucose, maltose, modified starches, dextrins, etc. Enzymes of this type include alpha- and beta- amylases. Alpha-amylases, such as those obtained from bacterial sources (*Bacillus subtilis* or *B. mesintericus*) are known to be heat-stable, and have been reported to be able to retain some activity at temperatures as high as 100° C. The number of SKB units of amylase enzyme per 100 grams of flour will typically be about 6 to 1000 units. Pregelatinized starch may be added to the dough to produce a readily available substrate for the enzyme. SKB units may be assayed by the method of Sandstetde, Kneen and Blish, described in *Cereal Chemistry*, 16, 712 (1939). Amylase enzymes are commercially available, and include Fresh-N, a product of G. B. Fermentation Industries Inc, Charlotte, N.C. as well as Termanyl and Bacterial Amylase Novo (Ban) which are products of Novo Industry A/S, Novo Alle, DK-2880, Bagsvaerd, Denmark.

The flour and shortening employed in the process and compositions of this invention are selected from conventional ingredient lines. The flour component may be any comminuted cereal grain or edible seed meal such as wheat flour, corn flour, corn starch, modified starch, rice flour, potato flour, barley flour, or the like. Wheat flour is preferred; the wheat flour may be blended or unbleached, although bleached flour tends to give less oven spread during baking. The shortening may be any edible fat or oil or mixtures thereof suitable for baking applications, and may further include conventional food-grade emulsifiers. The shortening may be present in each dough in amounts ranging from about 20% to about 80% by weight, based upon the weight of the flour.

The flour of each dough may contain from about 0% to about 5% by weight of a leavening system, based upon the weight of the flour in each dough. The leavening system employed in each dough may be the same or different.

In addition to the foregoing, the dough(s) may include other additives conventionally employed in cookie products. Exemplary thereof are milk products or milk by-products, egg products or egg by-products, cocoa, vanilla, cereal (oatmeal), as well as inclusions such as nuts, raisins, coconut, flavor chips, such as chocolate chips, butterscotch chips, caramel chips, and the like. If flavor chips are to be added, they are preferably added as the last ingredient to the dough with minimal mixing so as to avoid smearing of the flavor chips into the dough.

The dough(s) used in the process and compositions of the present invention can each be prepared in a conventional manner using a creaming stage and a dough forming stage. However, the preferred technique for admixing the glass-forming polysaccharide and humectant sugar with the other ingredients of the dough in the process of the invention differs somewhat from the conventional process normally employed to mix sucrose into a sucrose-containing dough. When using sucrose, part of the sucrose is mixed with the fat or shortening in the creaming stage and then the remainder of the sucrose is added together with the flour later in the dough-forming stage. If this procedure is adopted with a glass-forming polysaccharide, the polysaccharide tends to form undesirable lumps in the dough-forming stage. In order to produce good mixing of the glass-forming polysaccharide with the remaining components of the dough, we prefer to first blend the whole of the polysaccharide with the fat or shortening, and thereafter to blend the resultant mixture first with the humectant sugar and then with the flour.

The time and temperature of baking the dough compositions of the present invention to prepare finished cookies are adjusted in accordance with conventional techniques to provide a moisture content in the baked cookie of about 6% or above. The preferred moisture content ranges from about 6% to about 7%, based upon the weight of the baked cookie. The water activity of the baked cookie should be less than about 0.7, preferably less than or equal to about 0.6, to assure microbial shelf stability. While baking time and temperatures will vary for different dough formulations, oven type, etc., in general, commercial cookie baking times may range from about 5 minutes to 15 minutes, and baking temperatures for cookies may range from about 50° F. to about 500° F.

The cookie dough compositions of the present invention may be used for the production of drop-type cookies, such as chocolate chips cookies, oatmeal cookies, peanut butter cookies, sugar cookies, and the like.

As employed herein with reference to multi-textured cookies, the term "chewy" refers to texture which possess a discernible degree of plasticity. Chewiness also involves impressions of softness and moistness. Crispness and chewiness can be described in terms of taste panel tests which take as standards the texture of fresh saltine crackers having a moisture content of about 2% (rating of 0) and a freshly baked cookie having a distinctly chewy texture throughout (rating of 10): i.e., chewy cookies prepared in accordance with the following recipe:

| | |
|---|---|
| ⅜ cup | sugar (sucrose) |
| ¼ cup | butter or regular margarine |
| 1 tsp. | ground ginger |
| ¼ tsp. | ground cinnamon |
| ¼ tsp. | baking soda |
| ¼ tsp. | salt |
| ¼ tsp. | vanilla |
| 1 | egg |
| ¼ cup | honey |
| 1¼ cup | sifted flour |

The cookies are prepared by combining ⅜ cup of sugar, butter, ginger, cinnamon, baking soda, salt and vanilla in a large mixing bowl and creaming the ingredients until they are light and fluffy. Next the eggs are added and beat in until the mixture is very fluffy. The honey is then blended in, followed by the blending in of the flour a little at a time. The dough is dropped by teaspoonfuls 2 ½ inches apart onto a lightly greased baking sheet, baked at 350° F. for 10 to 15 minutes until lightly browned and removed at once from the baking sheet to racks to cool thoroughly.

Employing the rating scale described above, the chewy portion of the multi-textured cookie preferably has a rating of at least 3 and most preferably at least 5. The crispy portion preferably has a rating of less than 5 and most preferably less than 2. The regions should show a difference in ratings of at least 2 units, and most preferably at least 5 units.

The following Examples are now given, though by way of illustration only, to show details of particularly preferred ingredients, proportions and techniques used in the process and cookies of the invention.

EXAMPLE 1

This Example illustrates the preparation of a multi-textured chocolate chip cookie of the invention having a crisp outer layer in which the sweetening agent is a combination of a maltodextrin, fructose and dextrose and a soft, chewy center in which the sweetening agent comprises fructose.

A casing dough was prepared from the following ingredients:

| Ingredient | Parts by Wt | % by wt | % by wt excluding chocolate drops |
|---|---|---|---|
| Unbleached soft wheat flour | 48.0 | 34.30 | 39.22 |
| Maltodextrin (Lo-Dex 10) | 18.425* | 13.17 | 15.06 |
| Vegetable Shortening | 25.90 | 18.51 | 21.16 |
| High fructose corn syrup | 13.394** | 10.29 | 11.76 |
| Dextrose | 3.438 | 2.46 | 2.81 |
| Sodium bicarbonate | 0.544 | 0.389 | 0.445 |
| Sodium acid pyrophosphate #4 | 0.125 | 0.089 | 0.102 |
| Minor flavoring and texturizing ingredients (whole egg powder, salt, vanilla and caramel color) | 1.552 | 1.110 | 1.267 |
| Chocolate drops (10000 count) | 17.563 | 12.55 | — |
| Water | 10.0 | 7.15 | 8.17 |
| | 139.941 | 100.00 | 100.00 |

*Lo-Dex 10 is a maltodextrin produced by hydrolyzing starch and sold commercially by American Maize-Products Company, Corn Processing Division, 1100 Indianapolis Boulevard, Hammond, Indiana 46320. Lo-Dex 10 has an approximate carbohydrate composition of 1 percent of monosaccharides, 4 percent of disaccharides, 5 percent of trisaccharides and 90 percent of tetra- or higher polysaccharides.
**The high fructose corn syrup contained 77 percent by weight solids, of which 90 percent was fructose. Thus, the outer dough (excluding the chocolate drops) comprised 8.15 percent by weight fructose.

The casing dough was prepared using a Hobart mixing bowl. The maltodextrin, shortening, dextrose, salt and whole egg powder were added to the bowl and mixed at medium speed for 3 minutes. The high fructose corn syrup, vanilla, caramel color and water were then added and the medium speed mixing continued for a further one minute. The flour, sodium bicarbonate and sodium acid pyrophosphate were then added and the medium speed mixing continued for a further three minutes. Finally, the chocolate drops were added and the medium speed mixing continued for a further one minute to produce the finished casing dough.

The filling dough for the multi-textured cookies was prepared from the following ingredients:

| Ingredient | Parts by Wt | % by Wt | % by wt excluding chocolate drops |
|---|---|---|---|
| Unbleached soft wheat flour | 24.563 | 24.558 | 29.298 |
| Rice flour | 4.500 | 4.499 | 5.368 |
| Sucrose | 7.813 | 7.811 | 9.319 |
| Vegetable shortening | 10.500 | 10.498 | 12.524 |
| Starch | 2.375 | 2.374 | 2.833 |
| Non-fat dried milk | 1.188 | 1.187 | 1.417 |
| High fructose corn syrup | 29.450* | 29.444 | 35.128 |
| Honey | 2.000 | 2.000 | 2.836 |
| Sodium bicarbonate | 0.369 | 0.369 | 0.440 |
| Sodium acid pyrophosphate #4 | 0.088 | 0.088 | 0.105 |
| Minor flavoring and texturizing ingredients (whole egg powder, salt and caramel color) | 0.988 | 0.988 | 1.178 |
| Chocolate drops (2000 count) | 16.188 | 16.184 | — |
| | 100.022 | 100.00 | 100.00 |

*The high fructose corn syrup was the same as that used in the outer dough and thus provided 24.3 per cent by weight of fructose in the inner dough (excluding the chocolate drops).

The filler dough was prepared by adding the sucrose, vegetable shortening, starch, dried milk, egg powder and salt to the Hobart mixing bowl and mixing for 3 minutes at medium speed. Next, the high fructose corn syrup, honey and caramel color were added and the medium speed mixing continued for 1 minute. The wheat flour, rice flour, sodium bicarbonate and sodium acid pyrophosphate were then added and the medium speed mixing continued for a further 3 minutes. Finally, the chocolate drops were added and the medium speed mixing continued for a further 1 minute to prepare the finished filler dough.

Multi-textured cookies were prepared from the filler and casing doughs by enrobing 6.5 g. portions of the filler dough in 6.5 g. portions of the casing dough and baking at 400° F. (204° C.) for 7.5 minutes.

The resultant cookies had a count per pound of 38, a moisture content of 5.5 percent by weight, a pH in 10 percent aqueous dispersion of 6.9 and a diameter of 2 ⅛ inch (54 mm).

The enable sensory comparisons to be made between the multi-textured cookies prepared by the process of the invention just described and a typical prior art multi-textured cookie using a sucrose-based casing dough, control filler and casing doughs were prepared having the following recipes.

| FILLER DOUGH | | |
|---|---|---|
| Ingredient | Parts by Wt. | % by weight |
| Unbleached soft wheat flour | 33.25 | 27.69 |
| Sucrose | 8.31 | 6.93 |
| Vegetable shortening | 12.63 | 10.53 |
| Starch | 2.81 | 2.34 |
| Non-fat dried milk | 1.31 | 1.09 |
| High fructose corn syrup* | 29.44 | 24.52 |
| Honey | 1.19 | 0.99 |
| Sodium bicarbonate | 0.42 | 0.35 |
| Sodium acid pyrophosphate #4 | 0.11 | 0.09 |
| Ammonium bicarbonate | 0.08 | 0.07 |
| Minor flavorizing and texturizing ingredients (whole egg powder, salt, and butter flavor) | 1.13 | 0.94 |
| Water | 4.31 | 3.59 |
| Chocolate drops (4800 count) | 25.00 | 20.82 |

*The high fructose corn syrup was the same as that used in the two doughs previously described and thus provided 17.01 percent by weight of fructose in the filler dough.

The filler dough was prepared in a manner exactly analogous to the filler dough previously described, except that 9.25 parts by weight of the flour, and the butter flavor, were added to the initial mixture containing the sucrose, vegetable shortening etc., and that the water and ammonium bicarbonate were added at the same time as the high fructose corn syrup, honey and caramel color.

| CASING DOUGH | | |
|---|---|---|
| Ingredient | Parts by Wt | % by Weight |
| Unbleached soft wheat flour | 44.38 | 31.72 |
| Sucrose | 31.00 | 22.16 |
| Molasses | 1.13 | 0.80 |
| Vegetable shortening | 22.00 | 15.73 |
| Dextrose | 2.19 | 1.56 |
| Soybean Oil | 4.44 | 3.17 |
| Honey | 1.44 | 1.03 |
| Sodium bicarbonate | 0.94 | 0.67 |
| Sodium acid pyrophosphate #4 | 0.34 | 0.23 |
| Minor flavoring and texturizing ingredients (whole egg powder, salt and caramel color) | 1.47 | 1.04 |
| Chocolate drops (1000 count) | 22.19 | 15.86 |
| Water | 8.44 | 6.03 |
| | 139.96 | 100.00 |

The casing dough was prepared in a manner exactly analogous to the casing dough previously described, except that the sucrose, soybean oil, molasses and honey were all added to the initial mixture containing the vegetable shortening, dextrose etc.

The control filler and casing doughs were then combined and baked to produce control multi-textured cookies in the same manner previously described.

The cookies prepared by the process of the invention and the control cookies were stored in closed containers and then evaluated for appearance, flavor and texture by a non-expert panel. The cookies prepared by the process of the invention had thinner, lower shoulders than the control cookies. Both types of cookies had a caramelized, sweet chocolate flavor, the flavor of the cookies prepared by the process of the invention being somewhat less than that of the control cookies, although still entirely acceptable. The cookies prepared by the process of the invention had a chewy, crisp surface and a soft center, while the control cookies were chewy, moist and moderately soft.

EXAMPLE 2

This Example illustrates the preparation of a multi-textured oatmeal raisin cookie of the invention having a crisp outer layer in which the sweetening agent is a combination of a maltodextrin, fructose and dextrose and a soft, chewy center in which the humectant comprises fructose.

A casing dough was prepared from the following ingredients:

| Ingredient | Parts by Wt. | % by wt. |
|---|---|---|
| Unbleached soft wheat flour | 47.69 | 34.06 |
| Maltodextrin (Lo-Dex 10) | 15.31 | 10.96 |
| Vegetable Shortening | 25.69 | 18.36 |
| High fructose corn syrup | 17.50* | 12.50 |
| Dextrose | 3.44 | 2.44 |
| Sodium bicarbonate | 0.56 | 0.4 |
| Sodium acid pyrophosphate #4 | 0.13 | 0.09 |
| Minor flavoring and texturizing ingredients (whole egg powder, salt, vanilla, oatmeal raisin flavor, cinnamon, and caramel color) | 1.84 | 1.34 |
| Raisins | 13.88 | 9.92 |
| Oats | 3.50 | 2.48 |
| Water | 10.50 | 7.48 |
| | 126.16 | 100.00 |

*The high fructose corn syrup used was the same as in Example 1 above, and thus provided 8.6 percent by weight of fructose in the casing dough.

The casing dough was prepared using a Hobart mixing bowl. The maltodextrin, shortening, dextrose, salt and whole egg powder were added to the bowl and mixed at low speed for 1 minute, then at high speed for 3 minutes. The high fructose corn syrup, vanilla, Ottens flour, cinnamon, caramel color and water were then added and the mixing continued for a further 1 minute at low speed. The flour, sodium bicarbonate and sodium acid pyrophosphate were then added and the mixing continued for a further 2 minutes at low speed, then for a further 1 minute at high speed. Finally, the raisins and oats were added and the mixing continued for a further 30 seconds at low speed to produce the finished outer dough.

The filler dough for the multi-textured cookies was prepared from the following ingredients:

| Ingredient | Parts by Wt. |
|---|---|
| Unbleached soft wheat flour | 28.19 |
| Dextrose | 3.41 |
| Vegetable shortening | 13.65 |
| Starch | 2.17 |
| Non-fat dried milk | 1.08 |
| High fructose corn syrup | 29.56* |
| Honey | 1.82 |
| Sodium bicarbonate | 0.34 |
| Sodium acid pyrophosphate #4 | 0.08 |
| Minor flavoring and texturizing ingredients (whole egg powder, salt, oatmeal raising #2288 flavor, cinnamon, and caramel color) | 1.04 |
| Raisin paste | 9.10 |
| Raisins | 6.82 |
| Rolled oats | 2.73 |
| | 100.00 |

*The high fructose corn syrup was the same as that used in Example 1 above and thus provided 20.5 percent by weight of fructose in the filler dough.

The filler dough was prepared by adding the vegetable shortening, dextrose, starch, dried milk, cinnamon, oatmeal raisin flavor, rolled oats, salt and dried eggs to the Hobart mixing bowl and mixing for 1 minute at low speed, then for 3 minutes at high speed. Next, the high fructose corn syrup, honey caramel color and raisin paste were added and the mixing continued for 1 minute at low speed. The flour, sodium bicarbonate and sodium acid pyrophosphate were added and the mixing continued for 2 minutes at low speed and thereafter for 1 minute at high speed. Finally, the raisins were added and the mixing continued for 30 seconds at low speed.

Multi-textured cookies were prepared from the filler and casing doughs by enrobing 6.5 g. portions of the filler dough in 6.5 g. portions of the casing dough and baking at 400° F. (204° C.) for 7.5 minutes.

EXAMPLE 3

This example illustrates the preparation of a multi-textured peanut butter chocolate chip cookie of the invention having a crisp outer layer in which the sweetening agent is a combination of a maltodextrin, fructose and dextrose and a soft, chewy center in which the humectant comprises fructose.

A casing dough was prepared from the following ingredients:

| Ingredient | Parts by Wt. | % by wt. |
|---|---|---|
| Unbleached soft wheat flour | 44.88 | 32.06 |
| Maltodextrin (Lo-Dex 10) | 17.25 | 12.32 |
| Vegetable shortening | 17.63 | 12.61 |
| High fructose corn syrup | 17.00* | 12.15 |
| Dextrose | 3.13 | 2.30 |
| Sodium bicarbonate | 0.50 | 0.37 |
| Sodium acid pyrophosphate #4 | 0.11 | 0.08 |
| Minor flavoring and texturizing ingredients (whole egg powder, salt and peanut (Reynaud #11584) flavor) | 1.38 | 1.01 |
| Peanut butter | 6.56 | 4.67 |
| Cracked peanuts | 3.25 | 2.34 |
| Chocolate drops (10000 count) | 17.00 | 12.15 |
| Water | 11.13 | 7.94 |
| | 139.86 | 100.00 |

*The high fructose corn syrup was the same as that used in Example 1 above. Thus, the casing dough comprised 8.4 percent by weight fructose.

The casing dough was prepared using a Hobart mixing bowl. The maltodextrin, shortening, dextrose, peanut butter, salt and whole egg powder were added to the bowl and mixed at low speed for 1 minute; then at high speed for 3 minutes. The high fructose corn syrup, peanut butter and water were then added and the mixing continued for a further 1 minute at low speed. The flour, sodium bicarbonate and sodium acid pyrophosphate were then added and the mixing continued for a further 2 minutes at low speed, and thereafter for a further 1 minute at high speed. Finally, the chocolate drops and cracked peanuts were added and the mixing continued for a further 30 seconds at low speed to produce the finished casing dough.

The filler dough for the multi-textured cookies was prepared from the following ingredients:

| Ingredient | Parts by Wt. |
|---|---|
| Unbleached soft wheat flour | 28.35 |
| Dextrose | 2.36 |
| Glycerol | 1.89 |
| Peanut butter | 4.73 |
| Vegetable shortening | 11.81 |
| Starch | 2.24 |
| Non-fat dried milk | 1.12 |
| High fructose corn syrup | 30.72* |
| Sodium bicarbonate | 0.38 |
| Sodium acid pyrophosphate #4 | 0.09 |
| Minor flavoring and texturizing ingredients (whole egg powder, salt and peanut flavor) | 1.01 |
| Peanut butter drops (4000 count) | 9.62 |
| Cracked peanuts | 5.67 |
| | 100.00 |

*The high fructose corn syrup was the same as that used in Example 1 above and thus provided 21.3 percent by weight of fructose in the filler dough.

The filler dough was prepared by adding the vegetable shortening, peanut butter, starch, dried milk, dextrose, egg powder and salt to the Hobart mixing bowl and mixing for 1 minute at low speed, followed by 3 minutes at high speed. Next, the high fructose corn syrup, peanut flavor and glycerol were added and the mixing continued for a further 1 minute at low speed. The flour, sodium bicarbonate and sodium acid pyrophosphate were then added and the mixing combined for a further 2 minutes at low speed and thereafter for a further 1 minute at high speed. Finally, the peanut butter drops and cracked peanuts were added and the mixing continued for a further 30 seconds at low speed to prepare the finished filler dough.

Multi-textured cookies were prepared from the inner and outer doughs by enrobing 6.5 g. portions of the inner dough in 6.5 g. portions of the outer dough and baking at 400° F. (204° C.) for 7.5 minutes.

EXAMPLE 4

This Example illustrates the effect of varying the maltodextrin: fructose ratio in a dough composition of the present invention.

A series of multi-textured cookies were prepared by the process of the invention using the same filler doughs and casing doughs which were identical apart from the maltodextrin: fructose ratio.

The filler dough was prepared from the following ingredients:

| Ingredients | Parts by Weight |
|---|---|
| Unbleached medium wheat flour | 295.10 |
| Sodium bicarbonate | 3.60 |
| Sodium acid pyrophosphate #4 | 0.90 |
| Ammonium bicarbonate | 0.70 |
| Honey | 10.00 |
| High fructose corn syrup | 266.80 |
| Sucrose | 71.70 |
| Vegetable shortening | 109.00 |
| Starch | 24.40 |
| Non-fat dried milk | 11.50 |
| Minor flouring and texturizing ingredients (whole egg powder, salt and caramel color) | 9.00 |
| Water | 30.00 |
| Chocolate drops (2000 count) | 167.30 |
| | 1000.00 |

The filler dough was prepared in the same manner in Example 1 above, the sucrose, vegetable shortening, starch, dried milk, egg powder and salt being added to a Hobart mixing bowl and mixed for 3 minutes at medium speed. The ammonium bicarbonate, honey, high fructose corn syrup and caramel color were then added and the medium speed mixing continued for 1 minute. The flour, sodium bicarbonate and sodium acid pyrophosphate were then added and the medium speed mixing continued for a further 3 minutes. Finally, the chocolate drops were added and the medium speed mixing continued for a further 1 minute to prepare the finished filler dough.

The ingredients used in each of the casing doughs were as follows:

| Ingredients | Parts by Weight |
|---|---|
| Unbleached medium wheat flour | 328.90 |
| Sodium bicarbonate | 7.00 |
| Sodium acid pyrophosphate #4 | 2.50 |
| Molasses | 8.20 |
| Vegetable shortening | 164.50 |
| Minor flavoring and texturizing ingredients (caramel color, vanilla #3, whole egg powder and salt) | 9.20 |
| Chocolate drops (10,000 count) | 164.50 |

In addition to the above ingredients, the casing doughs contained varying amounts of sucrose, dextrose, high fructose corn syrup (the same syrup as used in Example 1 above), Lodex 5 (a maltodextrin sold commercially by American Maize-Products Company, having a dextrose equivalent of 7 percent and containing less than 1 percent of monosaccharides, less than 2 percent of disaccharides, less than 2 percent of trisaccharides and at least 95 percent of tetra-and high polysaccharides), and water. The control casing dough contained 230 parts by weight of sucrose 16.40 parts by weight of dextrose, and 69 parts by weight of water. The amounts of Lodex 5, high fructose corn syrup and water in the other casing doughs were adjusted so that the total amount of water in the casing doughs remained constant (with one exception noted below), the total solids provided by the maltodextrin and high fructose corn syrup equalled the total weight of sucrose and dextrose in the control casing dough, and the casing doughs contained 0/100, 15/85, 30/70, 45/55, 60/40, 75/25, and 90/10 maltodextrin/high fructose corn syrup solids mixtures. (An attempt was made to prepare a 100% maltodextrin/ 0% high fructose corn syrup solids casing dough, but the resultant dough could not be satisfactorily co-extruded with the filler dough).

The amounts of maltodextrin, high fructose corn syrup and water used in the experimental casing doughs were as follows:

| Maltodextrin/HFCS solids | Maltodextrin Parts by Wt. | HFCS Parts by Weight | Water Parts by Weight |
|---|---|---|---|
| 0/100 | 0 | 319 | 0 |
| 15/85 | 37 | 271 | 7 |
| 30/70 | 74 | 223 | 18 |
| 45/55 | 111 | 175 | 29 |
| 60/40 | 148 | 128 | 40 |
| 75/25 | 184 | 80 | 51 |
| 90/10 | 221 | 32 | 80* |

*To maintain the same moisture content in all the casing doughs, the 90/10 dough should contain 62 parts by weight of water. However, when only 62 parts of water were added, the 90/10 dough was insufficiently workable to allow proper enrobing of the filler dough with the casing dough.

The casing doughs were prepared using the same techniques for maltodextrin-containing and sucrose-based casing doughs as described in Example 1 above.

The various casing doughs were combined with the filler dough and baked to produce batches of multi-textured cookies using the same enrobing and baking conditions as in Example 1 above, two separate batches of cookies were prepared using the control casing dough. Twenty-four hours after baking the texture of 10 cookies from each batch was assayed by the Voland texture test In this test, a machine-controlled probe is driven into a cookie until a resistance of 5 g. is encountered. The probe is then drawn a predetermined distance into the cookie and the peak resistance encountered measured. In the present tests, the predetermined distance was chosen as 2 mm. since it was desired to measure the texture of the outer layer derived from the casing dough rather than the center derived from the filler. The results from each cookie tested, together with the average, standard deviation (S.D.) and co-efficient of variation (CV) for each batch are given in the table below. The spread factor for each batch was also measured.

Following these tests, the batches of cookies were stored in separate closed containers and the Voland texture test repeated 8 days after baking. These results are also reported in the table below.

| Cookie # | Maximum Resistance, g. | | | | | | | | |
|---|---|---|---|---|---|---|---|---|---|
| | Control A | Control B | 0/100 | 15/85 | 30/70 | 45/55 | 60/40 | 75/25 | 90/10 |
| | 24 Hours After Baking | | | | | | | | |
| 1 | 130 | 135 | 145 | 172 | 95 | 134 | 158 | 350 | 475 |
| 2 | 120 | 223 | 133 | 118 | 103 | 200 | 165 | 180 | 748 |
| 3 | 195 | 125 | 106 | 128 | 91 | 175 | 230 | 476 | 250 |
| 4 | 190 | 160 | 80 | 105 | 90 | 130 | 199 | 220 | 630 |
| 5 | 105 | 115 | 142 | 125 | 100 | 185 | 160 | 258 | 780 |
| 6 | 95 | 195 | 165 | 95 | 105 | 200 | 242 | 303 | 475 |

-continued

| Cookie # | Control A | Control B | 0/100 | 15/85 | Maximum Resistance, g. 30/70 | 45/55 | 60/40 | 75/25 | 90/10 |
|---|---|---|---|---|---|---|---|---|---|
| 7 | 91 | 150 | 185 | 123 | 115 | 155 | 332 | 300 | 720 |
| 8 | 190 | 170 | 118 | 95 | 131 | 143 | 181 | 540 | 853 |
| 9 | 160 | 88 | 132 | 105 | 125 | 175 | 290 | 250 | 995 |
| 10 | 133 | 164 | 78 | 113 | 105 | 170 | 385 | 253 | 763 |
| Average | 140.9 | 152.5 | 128.4 | 117.9 | 106.0 | 166.8 | 234.2 | 313.0 | 668.9 |
| S.D. | 40.3 | 39.3 | 34.2 | 22.4 | 13.8 | 25.3 | 78.6 | 113.9 | 216.7 |
| C.V. % | 28.6 | 25.8 | 26.6 | 18.9 | 13.0 | 15.2 | 33.6 | 36.4 | 32.4 |
| Spread factor | 62.07 | 56.78 | 51.34 | 54.48 | 54.65 | 47.96 | 46.63 | 44.63 | 31.74 |
| | | | | | 8 Days After Baking | | | | |
| 1 | 250 | 345 | 220 | 200 | 155 | 380 | 310 | 400 | 635 |
| 2 | 272 | 365 | 200 | 160 | 200 | 365 | 410 | 790 | 1000+* |
| 3 | 145 | 400 | 250 | 175 | 180 | 265 | 445 | 545 | 1000+ |
| 4 | 135 | 340 | 272 | 135 | 194 | 265 | 620 | 395 | 1000+ |
| 5 | 310 | 310 | 212 | 300 | 280 | 420 | 465 | 600 | 1000+ |
| 6 | 390 | 390 | 222 | 250 | 180 | 380 | 660 | 575 | 820 |
| 7 | 480 | 300 | 300 | 180 | 212 | 320 | 380 | 738 | 1000+ |
| 8 | 40 | 390 | 312 | 150 | 137 | 282 | 210 | 755 | 855 |
| 9 | 365 | 560 | 223 | 135 | 255 | 342 | 430 | 395 | 1000+ |
| 10 | 290 | 608 | 280 | 255 | 130 | 318 | 130 | 465 | 1000+ |
| Average | 267.7 | 400.8 | 249.1 | 194.0 | 192.3 | 333.7 | 406.0 | 565.8 | 931.0 |
| S.D. | 131.9 | 102.7 | 39.5 | 56.5 | 47.9 | 53.1 | 163.4 | 153.9 | 124.3 |
| C.V. % | 49.3 | 25.6 | 15.9 | 29.1 | 24.9 | 15.9 | 40.2 | 27.2 | 13.3 |

*Limit of instrumental range

The cookies having maltodextrin/fructose ratios from 0/100 to 30/70 were moist and reddish-brown in color. All cookies having ratios from 0/100 to 45/55 were relatively similar in Voland texture; as the portion of maltodextrin increased, the spread factor decreased. The cookies having a ratio of 90/10 would not be acceptable to consumers because of their hard texture and unusual grayish appearance.

From the data in the above table, and the above 10 mentioned visual observations it was concluded that the cookies with the 60/40 maltodextrin/fructose ratio would be most acceptable to consumers. The appearance of these cookies closely resembled that of the control cookies using the sucrose-based casing dough. Also, the texture of the 60/40 cookies was readily acceptable; by way of comparison, a sample of prior art multi-textured cookies taken from a mass-production run had an average Voland texture, 7 days after baking, of 329 5 g., with a standard deviation of 59 0 g., a C.V. of 17.9% and a spread factor of 59 72.

It will be apparent to those skilled in the art that numerous changes and modifications can be made in the preferred embodiments of the invention described above without departing from the scope of the invention, accordingly the whole of the foregoing description is to be construed in an illustrative not in a limitative sense, the scope of the invention being defined solely by appended claims.

We claim:

1. A process for preparing a multi-textured cookie comprising preparing a first cookie dough by mixing flour, fat or shortening and a humectant, preparing a second cookie dough by mixing flour, fat or shortening, and a sweetening agent comprising both an edible glass-forming polysaccharide and a humectant sugar, enrobing a portion of the first cookie dough within a portion of the second cookie dough to form a composite dough piece, and baking the composite dough piece to form a multi-textured cookie having a center with a soft or chewy texture and a crisp outer layer, the weight ratio of glass-forming polysaccharide to humectant sugar in the second cookie dough being in the range of from about 3:1 to about 1:1, and wherein the sweetening agent has no more than 25 percent by weight sucrose based on the weight of the sweetening agent.

2. A process according to claim 1 wherein, in the second cookie dough, the glass-forming polysaccharide comprises a maltodextrin.

3. A process according to claim 2 wherein the maltodextrin has a dextrose equivalent of from about 5 to about 15.

4. A process according to claim 3 wherein the maltodextrin has a dextrose equivalent of about 10 to about 15.

5. A process according to claim 2 wherein at least about 90 percent by weight of the carbohydrate in the maltodextrin is in the form of tetra- or higher polysaccharides.

6. A process according to claim 2 wherein the amount of the maltodextrin added to the dough is from about 10 to about 20 percent by weight of the dough.

7. A process according to claim 6 wherein the amount of the maltodextrin added to the dough is from about 12 to about 18 percent by weight of the dough.

8. A process according to claim 1 wherein, in the second cookie dough, the humectant sugar further comprises fructose.

9. A process according to claim 8 wherein the fructose is added to the doug in the form of a high fructose corn syrup.

10. A process according to claim 9 wherein the high fructose corn syrup contains at least about 80 percent by weight fructose on a solids basis.

11. A process according to claim 1 wherein, in the second cookie dough, the amount of the humectant sugar added to the dough is from about 6 to about 10 percent by weight of the dough.

12. A process according to claim 11 wherein the amount of the humectant sugar added to the dough is from about 6 to about 10 percent by weight of the dough.

13. A process according to claim 1 wherein, in the second cookie dough, the weight ratio of glass-forming polysaccharide to humectant sugar is in the range of from about 2.5:1 to about 1.5:1.

14. A process according to claim 1 wherein the second cookie dough comprises not more than 1 percent by weight of sucrose.

15. A process according to claim 14 wherein the dough is essentially free of sucrose.

16. A process according to claim 1 wherein the glass-forming polysaccharide is added to the second dough only.

17. A process according to claim 16, wherein the sweetening agent used in the first dough comprises a humectant sugar.

18. A cookie produced by the process of claim 1.

19. A process as claimed in claim 1 wherein said glass-forming polysaccharide is selected from the group consisting of maltodextrins, hydrolyzed cereals solids, corn syrup solids, and hydrogenated starch hydrolyzates.

20. A process for preparing a multi-textured cookie, which process comprises preparing each of a first and a second dough by mixing flour, a sweetening agent and fat or shortening, enrobing a portion of the first cookie dough with a portion of the second cookie dough to form a composite dough piece, and baking the composite dough piece to form a multi-textured cookie having a center with a soft or chewy texture and a crisp outer layer, wherein the sweetening agent in the second cookie dough comprises a maltodextrin having a dextrose equivalent of from about 5 to about 15 and fructose, the maltodextrin being added to the second cookie dough in an amount of from about 10 to about 20 percent by weight of the second cookie dough and the fructose being added to the second cookie dough in an amount of from about 1 to about 6 percent by weight of the second cookie dough, the second cookie dough comprising not more than about 1 percent by weight of sucrose.

21. A cookie produced by the process of claim 20.

22. A cookie dough composition for producing a multi-textured cookie, the cookie dough composition comprising a center formed of a first cookie dough comprising flour, a humectant and fat or shortening and bakeable to a soft or chewy texture, and an outer layer formed of a second cookie dough comprising flour, fat or shortening, a glass-forming polysaccharide and a humectant sugar, the second cookie dough being bakeable to a crispy texture, the weight ratio of glass-forming polysaccharide to humectant sugar in the second cookie dough being in the range of from about 3:1 to about 1:1, and wherein said dough has no more than 25% by weight sucrose by weight of said sweetening agent.

23. A composition according to claim 22 wherein, in the second cookie dough, the glass-forming polysaccharide comprises a maltodextrin.

24. A composition according to claim 23 wherein the maltodextrin has a dextrose equivalent of from about 5 to about 15.

25. A composition according to claim 24 wherein the maltodextrin has a dextrose equivalent of about 10 to about 15.

26. A composition according to claim 23 wherein at least about 90 percent by weight of the carbohydrate in the maltodextrin is in the form of tetra- or higher polysaccharide.

27. A composition according to claim 23 wherein the maltodextrin comprises from about 10 to about 20 percent by weight of the dough composition.

28. A composition according to claim 27 wherein the maltodextrin comprises from about 12 to about 18 percent by weight of the dough composition.

29. A composition according to claim 22 wherein, in the second cookie dough, the humectant sugar further comprises fructose.

30. A composition according to claim 29 wherein the fructose is present in the dough as a high fructose corn syrup.

31. A composition according to claim 29 wherein the fructose comprises from about 4 to about 12 percent by weight of the doug composition.

32. A composition according to claim 29 wherein the fructose comprises from about 6 to about 10 percent by weight of the dough composition.

33. A composition according to claim 22 wherein, in the second cookie dough, the weight ratio of glass-forming polysaccharide to humectant sugar is in the range of about 2.5:1 to about 1.5:1.

34. A composition according to claim 22 wherein the second cookie dough comprises not more than about 1 percent by weight of sucrose.

35. A composition according to claim 34 wherein the second cookie dough is essentially free of sucrose.

36. A composition according to claim 22 wherein the center is essentially free of edible glass-forming polysaccharides.

37. A composition according to claim 36 wherein the sweetening agent used in the center comprises a humectant sugar.

38. A cookie prepared by baking a dough composition according to claim 22.

39. A cookie dough composition as claimed in claim 22 wherein said glass-forming polysaccharide is selected from the group consisting of maltodextrins, hydrolyzed cereal solids, corn syrup solids, and hydrogenated starch hydrolyzates.

40. A cookie dough composition for producing a multi-textured cookie, the cookie dough composition comprising a center formed of a first cookie dough comprising flour, a humectant and fat or shortening and bakeable to a soft or chewy texture, and an outer layer formed of a second cookie dough comprising flour, fat or shortening, and a sweetening agent comprising both a glass-forming polysaccharide and a humectant sugar, the amount of glass-forming polysaccharide being from about 10 to about 20 percent by weight of said second cookie dough, and wherein said sweetening agent has no more than 25% by weight sucrose based on the weight of the sweetening agent, and the second cookie dough being bakeable to a crispy texture.

41. A composition according to claim 40 wherein the weight ratio of glass-forming polysaccharide to humectant sugar in the second cookie dough is in the range of from about 3:1 to about 1:1.

42. A composition as claimed in claim 41 wherein the glass-forming polysaccharide comprises a maltodextrin.

43. A cookie prepared by baking a dough composition according to claim 40.

44. A cookie dough composition as claimed in claim 40 wherein said glass-forming polysaccharide is selected from the group consisting of maltodextrins, hydrolyzed cereal solids, corn syrup solids, and hydrogenated starch hydrolyzates.

* * * * *